(12) United States Patent
Ubhayakar et al.

(10) Patent No.: US 11,794,631 B2
(45) Date of Patent: Oct. 24, 2023

(54) WORK LAMP ARRANGEMENT

(71) Applicant: VOLVO TRUCK CORPORATION, Gothenburg (SE)

(72) Inventors: Chinmay Ubhayakar, Bengaluru (IN); Abhinay Shrivastava, Bengaluru (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 6 days.

(21) Appl. No.: 17/597,529

(22) PCT Filed: Jun. 18, 2020

(86) PCT No.: PCT/EP2020/066872
§ 371 (c)(1),
(2) Date: Jan. 10, 2022

(87) PCT Pub. No.: WO2021/008804
PCT Pub. Date: Jan. 21, 2021

(65) Prior Publication Data
US 2022/0252243 A1    Aug. 11, 2022

(30) Foreign Application Priority Data

Jul. 16, 2019 (IN) .............................. 201941028612

(51) Int. Cl.
*B60Q 1/04*        (2006.01)
*F21L 4/08*        (2006.01)
(Continued)

(52) U.S. Cl.
CPC ........... *B60Q 1/0483* (2013.01); *B60Q 1/245* (2013.01); *F21L 4/08* (2013.01); *F21V 21/145* (2013.01);
(Continued)

(58) Field of Classification Search
CPC ........ F21V 21/145; F21V 21/14; F21V 21/30; F21V 21/00; B60Q 1/24; B60Q 1/0483;
(Continued)

(56) References Cited

U.S. PATENT DOCUMENTS

| 4,535,397 | A | 8/1985 | May |
| 5,142,457 | A | 8/1992 | Wehner |

(Continued)

FOREIGN PATENT DOCUMENTS

| DE | 29705339 U1 | 5/1997 |
| JP | H0740279 U | 7/1995 |

OTHER PUBLICATIONS

International Search Report and Written Opinion dated Nov. 11, 2020 in corresponding International PCT Application No. PCT/EP2020/066872, 10 pages.

*Primary Examiner* — Bao Q Truong
(74) *Attorney, Agent, or Firm* — Venable LLP; Jeffri A. Kaminski (57) ABSTRACT

The present disclosure relates to a work lamp arrangement (100) for a vehicle (1), comprising: —a portable work lamp (10) comprising means for emitting light, —at least a first default holder (20) and one or more second holders (30) for the portable work lamp which are adapted to be mounted onto the vehicle at different positions thereof, wherein the portable work lamp comprises a main body (11) and a connection member (12) for selectively and releasably mounting the portable work lamp to the at least first default holder and to the one or more second holders, wherein the connection member is a stem-formed member having a longitudinal extension along a center axis (C) thereof, wherein the stem-formed member protrudes from the main (Continued)

body, and at least one of the one or more second holders comprises a female receiving section (31) for receiving the stem-formed member.

15 Claims, 5 Drawing Sheets

(51) Int. Cl.
*F21V 21/14* (2006.01)
*H02J 7/00* (2006.01)
*B60Q 1/24* (2006.01)
*F21Y 115/10* (2016.01)

(52) U.S. Cl.
CPC ......... *H02J 7/0044* (2013.01); *F21Y 2115/10* (2016.08)

(58) Field of Classification Search
CPC ....... F21L 4/08; H02J 7/0044; F21Y 2115/10; F21W 2102/00; F21W 2107/00; F21W 2107/10

See application file for complete search history.

(56) References Cited

U.S. PATENT DOCUMENTS

| | | | |
|---|---|---|---|
| 5,607,221 A * | 3/1997 | Justus | B60Q 1/0088 439/35 |
| 7,021,802 B1 | 4/2006 | Wyatt | |
| 7,264,371 B1 * | 9/2007 | Seagriff | B60Q 1/2615 362/396 |
| 2008/0165550 A1 * | 7/2008 | Carmi | F21V 21/06 362/183 |
| 2009/0201689 A1 * | 8/2009 | Nolle | B60Q 1/2661 362/485 |
| 2014/0112010 A1 | 4/2014 | Lambert et al. | |

\* cited by examiner

WORK LAMP ARRANGEMENT

CROSS-REFERENCE TO RELATED APPLICATIONS

This application is a U.S. National Stage application of PCT/EP2020/066872, filed Jun. 18, 2020, and published on Jan. 21, 2021, as WO 2021/008804 A1, all of which is hereby incorporated by reference in its entirety.

TECHNICAL FIELD

The invention relates to a work lamp arrangement for a vehicle and/or to a vehicle comprising the work lamp arrangement.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

Commercial vehicles, such as trucks, may be equipped with one or more work lamps for illuminating certain areas of the truck for e.g. performing pre-trip inspections of the truck in case of poor ambient light conditions. The work lamps are usually provided at predefined locations on the vehicle, such as at the rear of a cab of the truck, the roof top of the vehicle, along the chassis frame of the vehicle etc. The work lamp may also be mounted on a trailer for the vehicle.

Known work lamp arrangements comprises one or more work lamps provided on the vehicle which are attached at fixed positions. It is also known to have portable work lamps, where one such design can be found in the patent application with no. US 2019/0092225 A1.

Even though it is known to have portable work lamps for vehicles, there is still a strive of providing an improved work lamp arrangement which is easy to handle for a user, which provides beneficial illumination performance and which is cost-effective.

SUMMARY

In view of the above, an object of the invention is to provide an improved work lamp arrangement for a vehicle which at least in some aspect alleviates at least one of the drawbacks of the prior art, and/or which provides a good alternative.

According to a first aspect, the object is achieved by a work lamp arrangement for a vehicle according to claim 1. According to a second aspect, the object is achieved by a vehicle according to claim 15.

According to the first aspect of the invention, the object is achieved by a work lamp arrangement for a vehicle, comprising:
  a portable work lamp comprising means for emitting light,
  at least a first default holder and one or more second holders for the portable work lamp which are adapted to be mounted onto the vehicle at different positions thereof,
  wherein the portable work lamp comprises a main body and a connection member for selectively and releasably mounting the portable work lamp to the at least first default holder and to the one or more second holders, wherein the connection member is a stem-formed member having a longitudinal extension along a center axis thereof, and wherein the stem-formed member protrudes from the main body, and at least one of the one or more second holders comprises a female receiving section for receiving the stem-formed member.

By the provision of the work lamp arrangement as disclosed herein, a cost-effective work lamp arrangement configuration for a vehicle is achieved and further it provides a portable work lamp which is easy to handle for a user. More particularly, by having one first default holder and one or more second holders which are provided onto a vehicle at different positions thereof, a user may easily bring the portable work lamp to the different positions when required. Further, by configuring the connection member as a stem-formed member which protrudes from the main body, a cost effective connection configuration is provided which also is easy to handle for the user. In fact, the stem-formed member will easily be recognized as the connection member for the user, thereby providing an intuitive connection procedure, i.e. the user will easily understand how to connect the portable work lamp, even if it is the first time the portable work lamp is being used.

A stem-formed member as used herein may be defined as an elongated member extending in a longitudinal extension along a center axis thereof, which protrudes from the main body, and which preferably is substantially cylindrically shaped. The cross section of the substantially cylindrically shaped member may be circular, oval, square-formed, rectangular or any other suitable shape which can be received in a female receiving section. The stem-formed member may according to an example embodiment deviate from the cylindrical shape by having a somewhat cone-shaped form, whereby a diameter of the stem-formed member is reducing slightly in the direction away from the main body.

The first default holder is preferably a holder onto which the portable work lamp shall be mounted when the portable work lamp is not used by a user. However, it shall be noted that the portable work lamp may also be used for illuminating a section of the vehicle when it is mounted to the first default holder. Preferably, the first default holder is mounted onto a cab of the vehicle, such as a cab of a truck.

Optionally, the female receiving section may comprise an aperture into which the stem-formed member is adapted to be inserted, in the direction of the center axis, whereby the female receiving section and the stem-formed member are adapted so that the stem-formed member can be releasably mounted to the at least one of the one or more second holders when the stem-formed member is received in the female receiving section. Still optionally, the female receiving section and the stem-formed member may be adapted so that the stem-formed member can be rotated about the center axis when being releasably mounted inside the female receiving section. Thereby a user may easily adjust the direction of the means for emitting light by rotating the portable work lamp. Hence, and still optionally, the main body may be rigidly attached to the stem-formed member, thereby providing a more cost-effective configuration which does not require any joint or the like between the stem-formed member and the main body. As another example, the portable work lamp may comprise a joint between the stem-formed member and the main body, thereby improving the freedom for adjusting the direction of the means for emitting light. The joint may be configured so that the main body can be pivoted about the center axis of the stem-formed member and/or pivoted about an axle which is substantially perpendicular to the center axis. Still optionally, the at least one of the one or more second holders, which comprises the female receiving section and the aperture into which the stem-formed member is adapted to be inserted, further comprises a cover, such as a spring-biased swiveling flap, which covers the aperture when the portable work lamp is not mounted to the at least one of the one or more second holders. Thereby the inside of the female receiving section can be protected and sealed from the outside when the portable work lamp is e.g. mounted to the first default holder.

Optionally, the at least one of the one or more second holders which comprises the female receiving section and the stem-formed member comprises a locking arrangement for locking the stem-formed member in the female receiving section when it is mounted therein, the locking arrangement locking the stem-formed member so that it is locked in the direction of the center axis. Thereby the portable work lamp may not accidentally be released from the at least one of the one or more second holders when the user is using the portable work lamp, and e.g. rotates the portable work lamp to illuminate different sections of the vehicle or the surroundings of the vehicle. Still optionally, the locking arrangement may be a spring-based locking arrangement.

Optionally, the first default holder may comprise a receiving section, such as a recess, for receiving the stem-formed member so that the stem-formed member can be releasably mounted thereto. Still optionally, when the receiving section of the first default holder is a recess, the recess is adapted so that the stem-formed member can be inserted therein in a direction which is substantially perpendicular to the center axis of the stem-formed member. It has namely been realized that it may be preferred if the first default holder has a different configuration than the one or more second holders. The configuration of the first default holder may namely be configured to provide a safe and reliable connection of the portable work lamp when the vehicle is driving. Therefore, the configuration of the one or more second holders, which are rather preferably configured to provide a beneficial connection when the portable work lamp is being used, may not be suitable to safely and reliably store the portable work lamp when the vehicle is moving.

Optionally, the recess of the first default holder may extend from an entrance portion, where the stem-formed member can be inserted, to an end portion defining an end stop for the stem-formed member, whereby the recess extends in a first extension from the entrance portion to an intermediate portion, followed by a second extension from the intermediate portion to the end portion, wherein the first and second extensions of the recess are angled relative each other. Thereby, the portable work lamp may be securely mounted to the first default holder by changing a direction when inserting the stem-formed member into the recess. In fact, by said configuration, the risk of unintentional release of the portable work lamp may be mitigated. Still optionally, the recess may be substantially L-shaped.

Optionally, the first default holder may comprise a spring-biased member, such as a spring-biased plunger member, for locking the work lamp thereto when the stem-formed member is located in the recess, preferably when the stem-formed member is located at the end portion of the recess. Thereby the portable worklamp may be releasably mounted in a reliable manner. Still optionally, the spring-biased member may be adapted to be moveable in a first direction and to provide a spring-biased force onto the portable work lamp so that the stem-formed member can be moved from the intermediate portion to the end portion and locked in a locked position at the end portion by the provided spring-biased force. Still optionally, the spring-biased member may further be moveable in an opposite second direction so that the stem-formed member can be released from the locked position at the end portion. The aforementioned configuration has shown to provide a safe and reliable connection which also is easy to handle by a user.

Optionally, the first default holder may be adapted so that the stem-formed member is substantially non-rotatable about the center axis when mounted to the first default holder. Thereby, the portable work lamp may be safely mounted to the vehicle when the vehicle is moving, reducing the risk that the portable work lamp is damaged.

Optionally, the portable work lamp may comprise an energy storage system, preferably a battery, and wherein preferably at least the first default holder comprises means for charging the energy storage system when the portable work lamp is mounted thereto. Thereby the portable work lamp may be charged when it is mounted to the first default holder. As an alternative, or a complement, also at least one of the second holders may comprise means for charging the portable work lamp. Further, by having an energy storage system, the portable work lamp can easily be used by a user without the need of e.g. electrical cables which would negatively affect the portability of the portable work lamp.

Optionally, the means for emitting light may be any kind of light source, such as any kind of light source which produces light from electrical current, e.g. preferably LED (light-emitting diode) lights, but also it may be halogen lights, incandescent lights etc. Especially LED lights are preferred since they produce strong light with low energy consumption.

Still optionally, the portable work lamp may comprise a handle for a user to hold the portable work lamp. The handle is preferably mounted, such as pivotally mounted, to the main body of the portable work lamp. By use of a handle, the user may easily move the portable work lamp to different locations around the vehicle.

According to the second aspect of the invention, the object is achieved by a vehicle comprising the work lamp arrangement according to any one of the embodiments of the first aspect of the invention.

Advantages and effects provided by the second aspect of the invention are largely analogous to the advantages and effects as provided by the lamp unit housing according to the embodiments of the first aspect of the invention. It shall also be noted that all embodiments of the second aspect of the invention are applicable to and combinable with all embodiments of the first aspect of the invention and vice versa.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
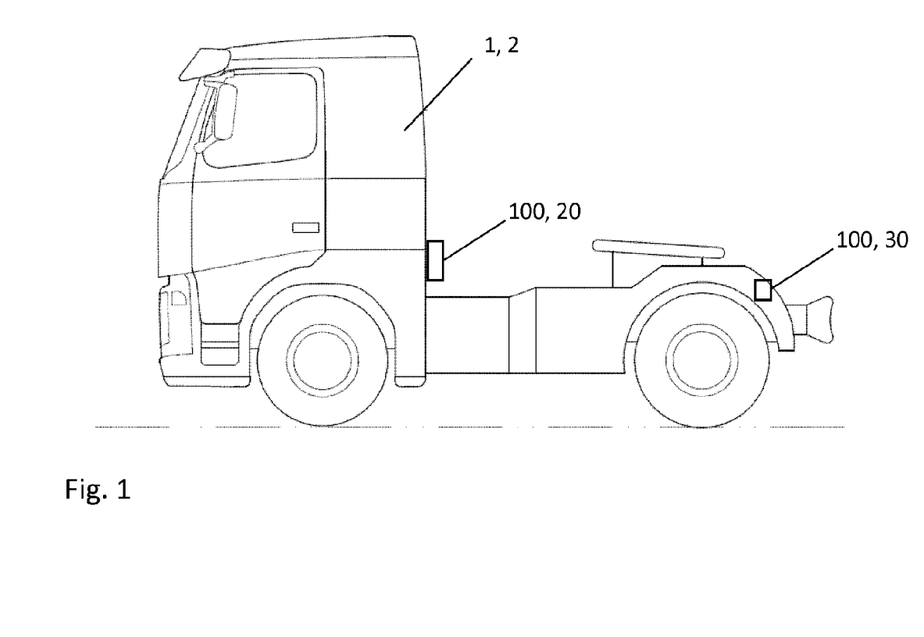
FIG. 1 shows a vehicle according to an example embodiment of the present invention.

FIG. 1 shows a vehicle 1 in the form of a towing truck according to an example embodiment of the second aspect of the present invention. The towing truck 1 comprises a work lamp arrangement 100 according to an example embodiment of the first aspect of the invention. The work lamp arrangement 100 comprises a first default holder 20 which is attached to a rear wall of a cab 2 of the truck 1 and a second holder 30 which is attached at the rear of the truck 1. The present invention is not restricted to this type of vehicle, but may be applicable to any other type of vehicle, such any other type of heavy duty truck, a bus, a construction equipment vehicle or the like.

Figure 2A:
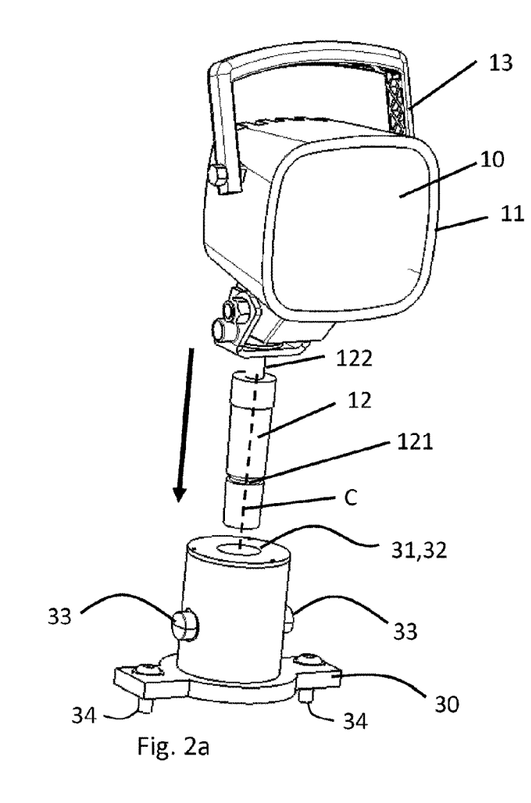
FIGS. 2a and 2b show a work lamp arrangement according to an example embodiment of the present invention.
Figure 2B:
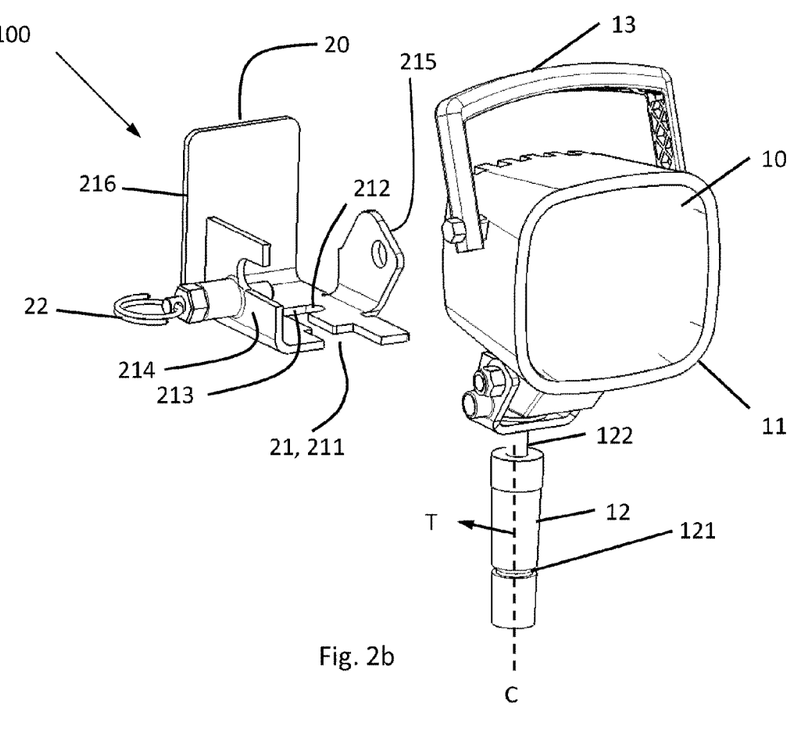

With respect to e.g. FIGS. 2a and 2b, a more detailed perspective view of a work lamp arrangement 100 is shown. The work lamp arrangement 100 comprises a portable work lamp 10 which comprises means for emitting light. It further comprises at least a first default holder 20 and one or more second holders 30 for the portable work lamp 10 which are adapted to be mounted onto the vehicle 1 at different positions thereof, as e.g. shown in FIG. 1. The portable work lamp 10 comprises a main body 11 and a connection member 12 for selectively and releasably mounting the portable work lamp 10 to the at least first default holder 20 and to the one or more second holders 30. The main body 11 comprises the means for emitting light. The connection member 12 is a stem-formed member having a longitudinal extension along a center axis C thereof, and wherein the stem-formed member 12 protrudes from the main body 11, and at least one of the one or more second holders 30 comprises a female receiving section 31 for receiving the stem-formed member 12.

Further, the female receiving section 31 comprises an aperture 32 into which the stem-formed member 12 is adapted to be inserted, in the direction of the center axis C, as shown by the arrow in FIG. 2a. The female receiving section 31 and the stem-formed member 12 are adapted so that the stem-formed member 12 can be releasably mounted to the at least one of the one or more second holders 30 when the stem-formed member 12 is received in the female receiving section 31. The aperture 32 may further be closed by a cover (not shown) when the portable work lamp 10 is not mounted therein. The cover may for example be a swivable cover, such as a spring-biased swiveling cover or flap. Such a cover/flap may protect and seal the inside of the second holder 30 when the portable work lamp 10 is not mounted thereto.

Further, the female receiving section 31 and the stem-formed member 12 are adapted so that the stem-formed member 12 can be rotated about the center axis C when being releasably mounted inside the female receiving section 31. Thereby a user may easily adjust the direction of the means for emitting light by rotating the portable work lamp 10 about the center axis C. As mentioned in the above, the main body 11 may be rigidly attached to the stem-formed member 12, or the portable work lamp 10 may comprise a joint (not shown) between the stem-formed member 12 and the main body 10, which is configured so that the main body 11 can be pivoted about the center axis C of the stem-formed member 12. The second holder 30 may further comprise connection means 34, such as screws, rivets, bolts or the like, for connecting it to the vehicle 1. The connection means 34 are for example configured so that the second holder 30 can be mounted on a substantially horizontal surface of the vehicle 1.

The at least one of the one or more second holders 30 as shown in e.g. FIG. 2a and the stem-formed member 12 comprises a locking arrangement 121, 33 for locking the stem-formed member 12 in the female receiving section 31 when it is mounted therein. The locking arrangement 121, 33 locks the stem-formed member 12 so that it is locked in the direction of the center axis C. Thereby the portable work lamp 10 cannot accidentally be released from the at least one of the one or more second holders 30 when a user is using the portable work lamp 10, and e.g. rotates the portable work lamp 10 about the center axis C to illuminate different sections of the vehicle 1 or the surroundings of the vehicle 1. The shown portion 33 of the locking arrangement 121, 33 which is provided on the second holder 30 is spring-based. More particularly, the portion 33 comprises a first and a second spring-biased member 33, such as the shown buttons, whereby pushing on the first and second buttons releases the stem-formed member 12 from the second holder 30. The stem-formed member 12 comprises a recess 121 into which clamping means (not shown) are brought for locking the portable work lamp 10 to the second holder 30, in a snap-fit connection manner. The clamping means are spring-biased and provides a clamping force onto the stem-formed member at the recess 121, thereby preventing the portable work lamp from being released from the second holder in the direction of the C-axis. The stem-formed member 12 is in the shown embodiments a substantially cylindrically formed member having a substantially circular cross section, as seen in a sectional plane being perpendicular to the center axis C. Further, a diameter of the cross section of the stem-formed member 12 is reducing slightly in the direction away from the main body 11 so that the substantially cylindrically formed stem-formed member 12 rather attains a somewhat cone-shaped profile. Thereby it may be easier to insert the stem-formed member 12 into the female receiving section 31 and its aperture 32.

Further, as e.g. shown in FIG. 2b, the first default holder 20 comprises a receiving section 21 in the form of a recess, for receiving the stem-formed member 12 so that the stem-formed member 12 can be releasably mounted thereto. The recess 21 is adapted so that the stem-formed member 12 can be inserted therein in a direction T which is substantially perpendicular to the center axis C of the stem-formed member 12. Further, as shown in FIG. 2b, the stem-formed member 12 may comprise a waist section 122 proximate the main body 11 which has a reduced diameter in comparison to the diameter of the section of stem-formed member 12 which is provided below the waist section 122, as seen when the portable work lamp 10 is in an upright position. The waist section 122 is adapted to be provided in the recess 21. This configuration improves the locking of the portable work lamp 10, especially in the direction of the center axis C.

The recess 21 extends from an entrance portion 211, where the stem-formed member 12 can be inserted, to an end portion 212 defining an end stop for the stem-formed member 12. Further, the recess 21 extends in a first extension from the entrance portion 211 to an intermediate portion 213, followed by a second extension from the intermediate portion 213 to the end portion 212, wherein the first and second extensions of the recess 21 are angled relative each other. In the shown embodiment, the first and second extensions are angled by approximately 90 degrees, thereby forming a substantially L-shaped recess 21. Further, the recess 21 is provided in a substantially horizontal plane, as seen when the first default holder is mounted on the vehicle 1, such as on the rear wall of the cab 2.

The first default holder 20, as e.g. shown in FIG. 2b, comprises a spring-biased plunger member 22 for locking the portable work lamp 10 thereto when the stem-formed member 12 is located at the end portion 212 of the recess 21. The spring-biased plunger member 22 is adapted to be moveable in a first direction and to provide a spring-biased force onto the portable work lamp 10 so that the stem-formed member 12 can be moved from the intermediate portion 213 to the end portion 212 and be locked in a locked position at the end portion 212 by the provided spring-biased force. Furthermore, the spring-biased plunger member 22 is also moveable in an opposite second direction so that the stem-formed member 12 can be released from the locked position at the end portion 212.

The first default holder 20 is further adapted so that the stem-formed member 12 is substantially non-rotatable about the center axis C when it is mounted to the first default holder and provided at the end portion 212. Thereby, the portable work lamp 10 may be safely mounted to the vehicle 1 when the vehicle 1 is moving, reducing the risk that the portable work lamp 10 is damaged. The first default holder 20 may comprise a first and a second side wall 214, 215 which prevents the portable work lamp 10 from rotating about the center axis C when it is provided in the recess 21. The first default holder 20 may further comprise a rear wall 216 which is configured to be mounted on e.g. a vertical cab wall of the vehicle 1. The spring-biased plunger 22 is here mounted to the first side wall 214. The rear wall 216 and the first and second side walls 214, 215 define a receiving space for the main body 11.

The stem-formed member 12 and the main body 11 may be mounted to each other by e.g. screws/rivets/bolts or the like, or by any other type of connection means. The main body 11 may further be swivable at the connection between the main body 11 and the stem-formed member 12, such as swivable about an axle which is substantially perpendicular to the center axis C. However, the stem-formed member 12 and the main body 11 may alternatively be integrated as one single piece.

The means for emitting light of the portable work lamp as shown in e.g. FIGS. 2a and 2b are LED lights. Further, according to an example embodiment of the present invention, The portable work lamp 10 may be configured so that the means for emitting light may be automatically switched on when the portable work lamp 10 is released from the first default holder 20 and/or automatically turned off when the portable work lamp 10 is brought back and locked to the first default holder 20. Thereby, a user may not need to manually turn on/off the lights when using the portable work lamp 10.

The portable work lamp 10 further comprises a handle 13 for a user to hold the portable work lamp 10. The handle 13 is preferably mounted, such as pivotally mounted, to the main body of the portable work lamp. The handle 13 may e.g. be swivable about an axle which is substantially perpendicular to the center axis C.

Figure 3:
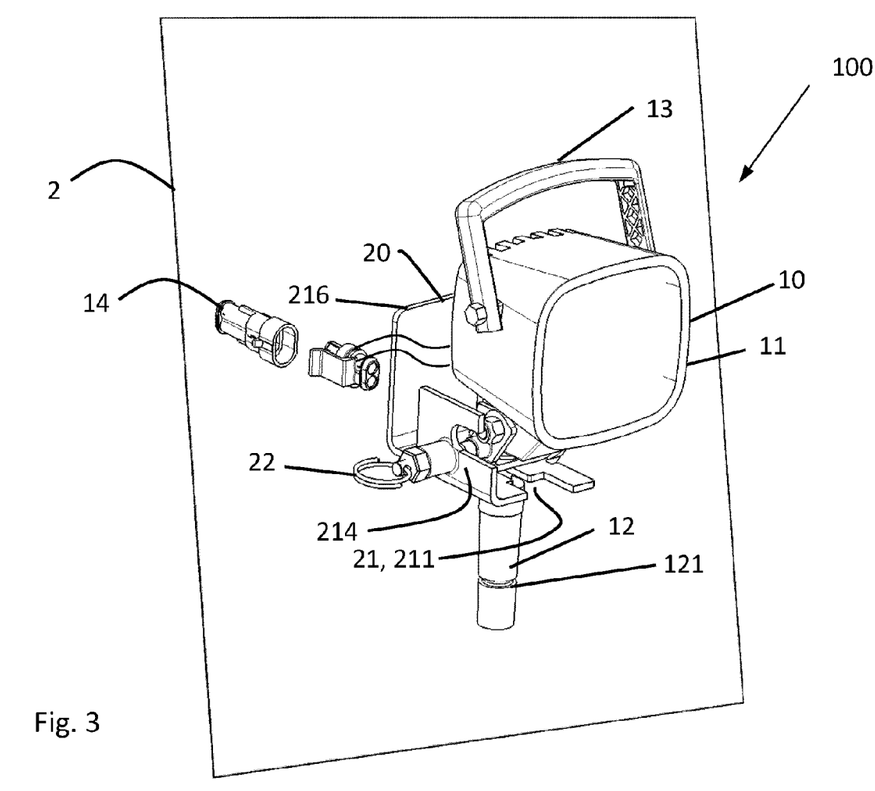
FIG. 3 shows a work lamp arrangement according to an example embodiment of the present invention when the portable work lamp is mounted to a first default holder.

FIG. 3 shows the work lamp arrangement 100 when it is mounted on a rear wall of the cab 2 of the vehicle 1 via the rear wall 216. As can be further seen, the portable work lamp 10 may be charged via an electrical connection 14 which charges a battery (not shown) of the portable work lamp 10.

Figures 4A, 4B, 4C:
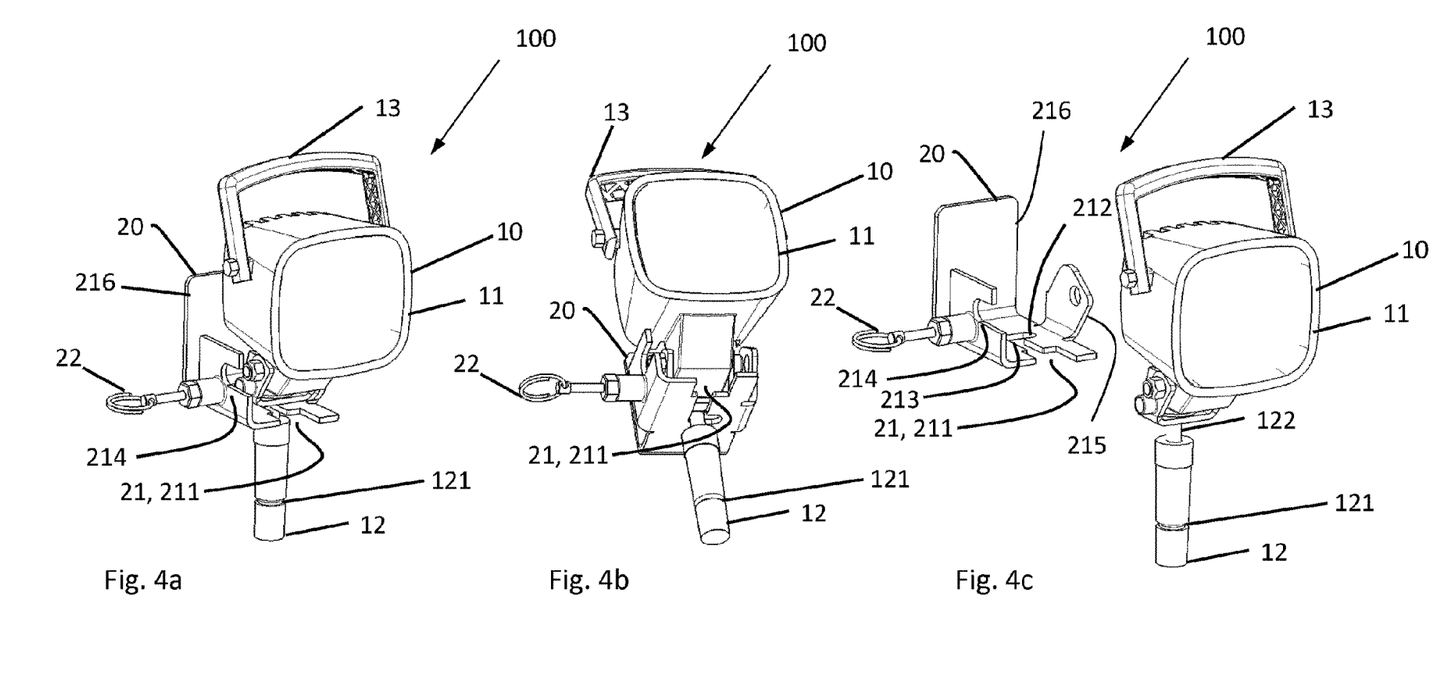
FIGS. 4a-4c show a work lamp arrangement according to an example embodiment of the present invention when the portable work lamp is released from the first default holder.

FIGS. 4a to 4c show a sequence when the portable work lamp is being released from the first default holder 20. The portable work lamp 10 is first provided at the end portion 212, whereby the spring-biased plunger 22 has been moved in the second direction so that the stem-formed member 12 is released from the locked position at the end portion 12. This is preferably done by a user which pulls in the spring-biased plunger 22. Subsequently, as shown in FIG. 4b, the stem-formed member 12 can be moved to the intermediate portion 213, and finally it can be released from the recess 21 by moving the stem-formed member out from the recess 21, as shown in FIG. 4c. The user may grip in the handle 13 and/or in the stem-formed member 12 when releasing the portable work lamp 10.

Figure 5:
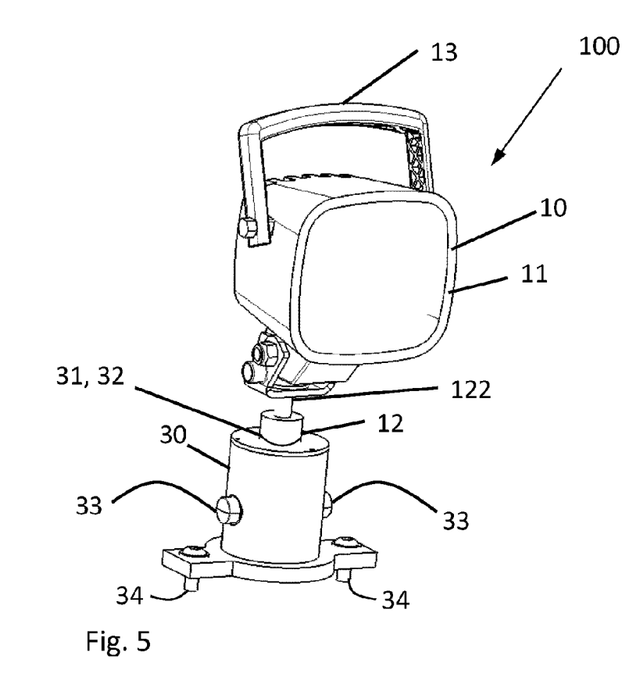
FIG. 5 shows a work lamp arrangement according to an example embodiment of the present invention when the portable work lamp is mounted to a second holder.

FIG. 5 shows the work lamp arrangement 100 when the stem-formed member 12 is provided in the female receiving section 31.

It is to be understood that the present invention is not limited to the embodiments described above and illustrated in the drawings; rather, the skilled person will recognize that many changes and modifications may be made within the scope of the appended claims.

The invention claimed is:

1. A work lamp arrangement for a vehicle, comprising: a portable work lamp comprising means for emitting light, at least a first default holder and one or more second holders for the portable work lamp which are adapted to be mounted onto the vehicle at different positions thereof, wherein the portable work lamp comprises a main body and a connection member for selectively and releasably mounting the portable work lamp to the at least first default holder and to the one or more second holders, wherein the connection member is a stem-formed member having a longitudinal extension along a center axis thereof, wherein the stem-formed member protrudes from the main body, and at least one of the one or more second holders comprises a female receiving section for receiving the stem-formed member.

2. The work lamp arrangement according to claim 1, wherein the female receiving section comprises an aperture into which the stem-formed member is adapted to be inserted, in the direction of the center axis, whereby the female receiving section and the stem-formed member are adapted so that the stem-formed member can be releasably mounted to the at least one of the one or more second holders when the stem-formed member is received in the female receiving section.

3. The work lamp arrangement according to claim 2, wherein the female receiving section and the stem-formed member are adapted so that the stem-formed member can be rotated about the center axis when being releasably mounted inside the female receiving section.

4. The work lamp arrangement according to claim 1, wherein the at least one of the one or more second holders comprising the female receiving section and the stem-formed member comprises a locking arrangement for locking the stem-formed member in the female receiving section when it is mounted therein, the locking arrangement locking the stem-formed member so that it is locked in the direction of the center axis.

5. The work lamp arrangement according to claim 4, wherein the locking arrangement is a spring-based locking arrangement.

6. The work lamp arrangement according to claim 5, wherein the first default holder comprises a receiving section for receiving the stem-formed member so that the stem-formed member can be releasably mounted thereto.

7. The work lamp arrangement according to claim 6, wherein when the receiving section of the first default holder is a recess, the recess is adapted so that the stem-formed member can be inserted therein in a direction being substantially perpendicular to the center axis of the stem-formed member.

8. The work lamp arrangement according to claim 7, wherein the recess extends from an entrance portion, where the stem-formed member can be inserted, to an end portion defining an end stop for the stem-formed member, whereby the recess extends in a first extension from the entrance portion to an intermediate portion, followed by a second extension from the intermediate portion to the end portion, wherein the first and second extensions of the recess are angled relative each other.

9. The work lamp arrangement according to claim 8, wherein the recess is substantially L-shaped.

10. The work lamp arrangement according to claim 8, wherein the first default holder comprises a spring-biased member for locking the work lamp thereto when the stem-formed member is located in the recess.

11. The work lamp arrangement according to claim 10, wherein the spring-biased member is adapted to be moveable in a first direction and to provide a spring-biased force onto the portable work lamp so that the stem-formed member can be moved from the intermediate portion to the end portion and locked in a locked position at the end portion by the provided spring-biased force.

12. The work lamp arrangement according to claim 11, wherein the spring-biased member is further movable in an opposite second direction so that the stem-formed member can be released from the locked position at the end portion.

13. The work lamp arrangement according to claim 1, wherein the first default holder is adapted so that the stem-formed member is substantially non-rotatable about the center axis when mounted to the first default holder.

14. The work lamp according to claim 1, wherein the portable work lamp comprises an energy storage system and wherein the first default holder comprises means for charging the energy storage system when the portable work lamp is mounted thereto.

15. A vehicle comprising the work lamp arrangement according to claim 1.

\* \* \* \* \*